United States Patent
Hashizume (10) Patent No.: US 11,293,393 B2
(45) Date of Patent: Apr. 5, 2022

(54) COMPRESSED SELF-IGNITION TYPE INTERNAL COMBUSTION ENGINE

(71) Applicant: TOYOTA JIDOSHA KABUSHIKI KAISHA, Toyota (JP)

(72) Inventor: Takeshi Hashizume, Mishima (JP)

(73) Assignee: TOYOTA JDDOSHA KABUSHIKI KAISHA, Toyota (JP)

(*) Notice: Subject to any disclaimer, the term of this patent is extended or adjusted under 35 U.S.C. 154(b) by 181 days.

(21) Appl. No.: 16/173,049

(22) Filed: Oct. 29, 2018

(65) Prior Publication Data

US 2019/0195183 A1 Jun. 27, 2019

(30) Foreign Application Priority Data

Dec. 27, 2017 (JP) .............................. JP2017-251635

(51) Int. Cl.
| | |
|---|---|
| *F02M 61/18* | (2006.01) |
| *F02M 61/14* | (2006.01) |
| *F02B 23/06* | (2006.01) |
| *F02B 23/02* | (2006.01) |
| *F02M 55/02* | (2006.01) |
| *F02B 23/10* | (2006.01) |

(52) U.S. Cl.
CPC ......... *F02M 61/1853* (2013.01); *F02B 23/02* (2013.01); *F02B 23/0651* (2013.01); *F02B 23/0654* (2013.01); *F02B 23/0666* (2013.01); *F02B 23/0669* (2013.01); *F02M 61/14* (2013.01); *F02M 61/1813* (2013.01); *F02B 23/101* (2013.01); *F02M 55/02* (2013.01)

(58) Field of Classification Search
CPC ...... F02M 61/1806; F02M 61/18–1853; F02B 23/0645–0654; F02B 23/02–04; F02B 19/108; F02B 19/18; F02B 23/00; F02B 23/0666; F02B 23/0669; F02F 1/242; F02F 1/40
USPC .................................................. 123/298, 470
See application file for complete search history.

(56) References Cited

U.S. PATENT DOCUMENTS

| | | | |
|---|---|---|---|
| 10,012,196 B1 * | 7/2018 | Qi | ........................ F02M 61/14 |
| 2012/0186555 A1 | 7/2012 | Mueller | |
| 2016/0097360 A1 * | 4/2016 | Mueller | ............... F02M 61/162 123/294 |
| 2016/0298529 A1 * | 10/2016 | Anders | ............... F02B 23/0651 |
| 2016/0298583 A1 * | 10/2016 | Anders | .............. F02M 61/1833 |

(Continued)

FOREIGN PATENT DOCUMENTS

| | | |
|---|---|---|
| JP | 2004-308449 A | 11/2004 |
| JP | 2013-092103 | 5/2013 |
| JP | 2017-530298 | 10/2017 |

*Primary Examiner* — Robert A Werner
(74) *Attorney, Agent, or Firm* — Oblon, McClelland, Maier & Neustadt, L.L.P.

(57) ABSTRACT

An internal combustion engine includes a fuel injection nozzle in which a nozzle hole that injects fuel is provided to be exposed to a combustion chamber from a cylinder head of the internal combustion engine, and a hollow duct in which an inlet and an outlet are exposed to the combustion chamber. The duct is provided to penetrate through an inside of the cylinder head so that fuel spray injected from the nozzle hole of the fuel injection nozzle passes from the inlet to the outlet. The duct is preferably configured so that a direction from the inlet to the outlet corresponds to a direction of the fuel spray injected from the nozzle hole.

8 Claims, 7 Drawing Sheets

(56) References Cited

U.S. PATENT DOCUMENTS

| | | | |
|---|---|---|---|
| 2017/0009712 A1* | 1/2017 | Svensson | F02M 31/20 |
| 2017/0089310 A1* | 3/2017 | Svensson | F02B 23/0618 |
| 2017/0114998 A1* | 4/2017 | Mueller | F02M 61/1806 |
| 2017/0350308 A1* | 12/2017 | Polonowski | F02B 19/108 |
| 2018/0195430 A1* | 7/2018 | Fitzgerald | F02M 61/1806 |
| 2018/0258836 A1* | 9/2018 | Anders | F02M 61/166 |
| 2019/0063391 A1* | 2/2019 | Martin | F02B 23/0651 |

* cited by examiner

COMPRESSED SELF-IGNITION TYPE INTERNAL COMBUSTION ENGINE

FIELD

The present disclosure relates to an internal combustion engine, and more particularly relates to a compressed self-ignition type internal combustion engine that performs combustion by directly injecting fuel into a compressed combustion chamber.

BACKGROUND

Conventionally, for example, Patent Literature 1 has disclosed an art for promoting premix of fuel and charged air in a combustion chamber in a compressed self-ignition type internal combustion engine. In this art, a duct configured by a hollow pipe is provided closely to an opening portion in a tip end portion of a fuel injection device that is exposed to the combustion chamber. The fuel that is injected from the opening portion is injected into the combustion chamber through the hollow pipe. Inside the hollow pipe, premix with the charged air is promoted in the process of the injected fuel passing. Thereby, distribution of excessively rich fuel is reduced in the combustion chamber, so that generation of smoke is reduced.

Following is a list of patent literatures which the applicant has noticed as related arts of embodiments the present disclosure.

Patent Literature 1: JP 2017-530298 A
Patent Literature 2: JP 2013-92103 A

SUMMARY

However, in the above described conventional art, the duct is positioned in the combustion chamber, in a hanging state. In a configuration like this, overheating of the duct is likely to advance when combustion in the combustion chamber is continuously performed. In this case, evaporation of the fuel is promoted in the process of passing through the duct, and combustion is likely to be caused before premix with the charged air advances.

The present disclosure is made in the light of the problem as described above, and has an object to provide an internal combustion engine that can suppress generation of smoke by promoting premix of fuel.

In order to attain the above described object, a first aspect of the disclosure is directed to an internal combustion engine of a compressed self-ignition type that performs combustion by injecting fuel into a compressed combustion chamber. The internal combustion engine includes a fuel injection nozzle having a nozzle hole that injects fuel, the nozzle hole being provided to be exposed to the combustion chamber from a cylinder head of the internal combustion engine, and a hollow duct in which an inlet and an outlet are exposed to the combustion chamber. The duct is provided to penetrate through an inside of the cylinder head so that fuel spray injected from the nozzle hole of the fuel injection nozzle passes from the inlet to the outlet.

A second aspect of the disclosure further has the following feature in the first aspect.

The duct may be configured so that a direction from the inlet to the outlet corresponds to a direction of the fuel spray injected from the nozzle hole.

A third aspect of the disclosure further has the following feature in the first aspect.

The fuel injection nozzle may have a plurality of the nozzle holes that differ in injection direction. A plurality of the ducts are provided correspondingly to the respective plurality of nozzle holes.

A fourth aspect of the disclosure further has the following feature in the first aspect.

The fuel injection nozzle may be configured so that an injection direction of the nozzle hole is in a range of 45° to 90° with respect to a cylinder center axis.

A fifth aspect of the disclosure further has the following feature in the first aspect.

A cylindrical recessed portion having a shape recessed cylindrically may be formed on a top surface of the cylinder head. The fuel injection nozzle is provided so that the nozzle hole is exposed to the combustion chamber from the cylindrical recessed portion. The duct is configured to penetrate through the inside of the cylinder head from the cylindrical recessed portion.

A sixth aspect of the disclosure further has the following feature in the first aspect.

The cylinder head may be configured by including an integrated member integrated with a top surface. The duct is configured to penetrate through the integrated member.

A seventh aspect of the disclosure further has the following feature in the sixth aspect.

The integrated member may be configured so that a surface area of a surface contacting the cylinder head is larger than a surface area of a surface exposed to the combustion chamber.

An eighth aspect of the disclosure further has the following feature in the sixth aspect.

The integrated member may be configured so that a surface area of an inner wall of the duct is smaller than a surface area of a surface contacting the cylinder head.

A ninth aspect of the disclosure further has the following feature in the sixth aspect.

The integrated member may be configured so that surface roughness of a surface where the duct is formed is rougher than surface roughness of a surface exposed to the combustion chamber.

A tenth aspect of the disclosure further has the following feature in the sixth aspect.

In the integrated member, a periphery of the nozzle hole may be formed into a shape that is protruded annularly.

An eleventh aspect of the disclosure further has the following feature in the sixth aspect.

The integrated member may be configured to cover a whole range of the top surface.

A twelfth aspect of the disclosure further has the following feature in the first aspect.

A cooling water flow path through which cooling water flows may be formed inside the cylinder head.

According to the first aspect, the fuel spray injected into the combustion chamber passes through the duct provided inside the cylinder head. The cylinder head has a large heat capacity, so that premix of the fuel spray passing through the duct and the charged air is advanced while the fuel spray is cooled. Thereby, premix with the charged air is advanced while self-ignition of the fuel spray is suppressed, so that excessively rich fuel can be prevented from burning. Thereby, reduction in smoke and enhancement of thermal efficiency due to reduction in an afterburning period can be achieved.

According to the second aspect, the fuel spray injected from the nozzle hole can smoothly passes from the inlet to the outlet of the duct.

According to the third aspect, premix of the fuel injected from the respective nozzle holes can be promoted, even when the plurality of nozzle holes are included.

According to the fourth aspect, the fuel spry passing through the duct hardly receives influence of an air current in the combustion chamber due to an ascent of a piston. Thereby, a spray penetration force of the fuel spray passing through the duct can be restrained from being reduced.

According to the fifth aspect, the duct is configured to penetrate through the inside of the cylinder head from the cylindrical recessed portion. Thereby, the inlet of the duct can be positioned to be closest to the nozzle hole, so that the fuel spray injected from the nozzle hole can be effectively guided to the duct.

According to the sixth aspect, the duct also can be configured to be provided in the integrated member integrated with the cylinder head. Thereby, flexible response is enabled to make changes to specifications of the duct.

As the contact area of the integrated member with the cylinder head is larger, a heat radiation degree of the integrated member becomes larger, and as the contact area of the integrated member with the combustion chamber is larger, an overheating degree of the integrated member becomes larger. According to the seventh aspect, the contact area of the integrated member with the cylinder head is configured to be larger than the contact area with the combustion chamber, so that heat radiation of the integrated member to the cylinder head is promoted as compared with the case where the contact area with the cylinder head is not larger than the contact area with the combustion chamber, and overheating of the duct can be suppressed.

According to the eighth aspect, the duct can be made hard to receive heat of the combustion chamber while heat radiation to the cylinder head from the integrated member is promoted. Thereby, it becomes possible to prevent overheating of the duct 20 and enhance cooling performance.

As the surface roughness is rougher, heat radiation performance becomes higher. According to the eighth aspect, the surface where the duct is formed, of the integrated member is configured so that the surface roughness is rougher than the surface exposed to the combustion chamber. Consequently, according to the present disclosure, the duct that hardly receives the heat in the combustion chamber and easily cools the injected fuel spray can be configured.

According to the ninth aspect, the duct is configured to penetrate through the inside from the inner circumferential side of the annular integrated member. Thereby, the inlet of the duct can be positioned to be closest to the nozzle hole, so that the fuel spray injected from the nozzle hole can be effectively guided to the duct.

According to the tenth aspect, the integrated member also can cover the whole surface of the top surface of the combustion chamber.

According to the eleventh aspect, the cooling water flow path through which the cooling water flows is formed inside the cylinder head. According to the configuration like this, the cooling efficiency of the duct provided inside the cylinder head can be further enhanced.

DESCRIPTION OF EMBODIMENTS

Hereinafter, embodiments of the present disclosure will be described with reference to the drawings. Note that when the numerals of the numbers, the quantities, the amounts, the ranges and the like of the respective elements are mentioned in the embodiments shown as follows, the present disclosure is not limited to the mentioned numerals unless specially explicitly described otherwise, or unless the disclosure is explicitly specified by the numerals theoretically. Further, the structures that are described in the embodiments shown as follows are not always indispensable to the disclosure unless specially explicitly shown otherwise, or unless the disclosure is explicitly specified by the structures theoretically.

First Embodiment

A first embodiment will be described with reference to the drawings.

1-1. Configuration of First Embodiment

Figure 1:
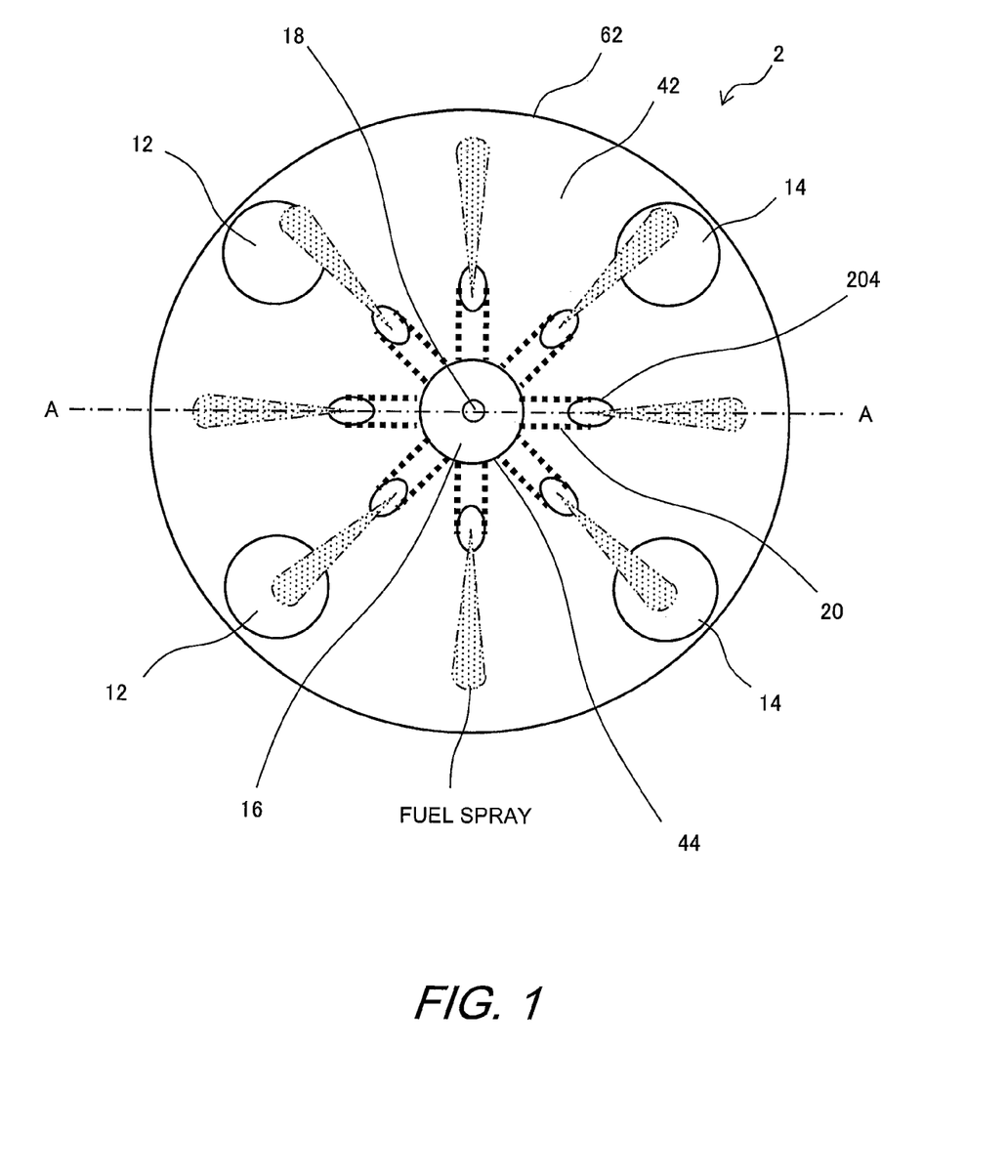
FIG. 1 is a view of an internal structure of a combustion chamber of an internal combustion engine according to a first embodiment schematically seen through from an undersurface side.

FIG. 1 is a view of an internal structure of a combustion chamber of an internal combustion engine according to the first embodiment schematically seen through from an undersurface side.

Figure 2:
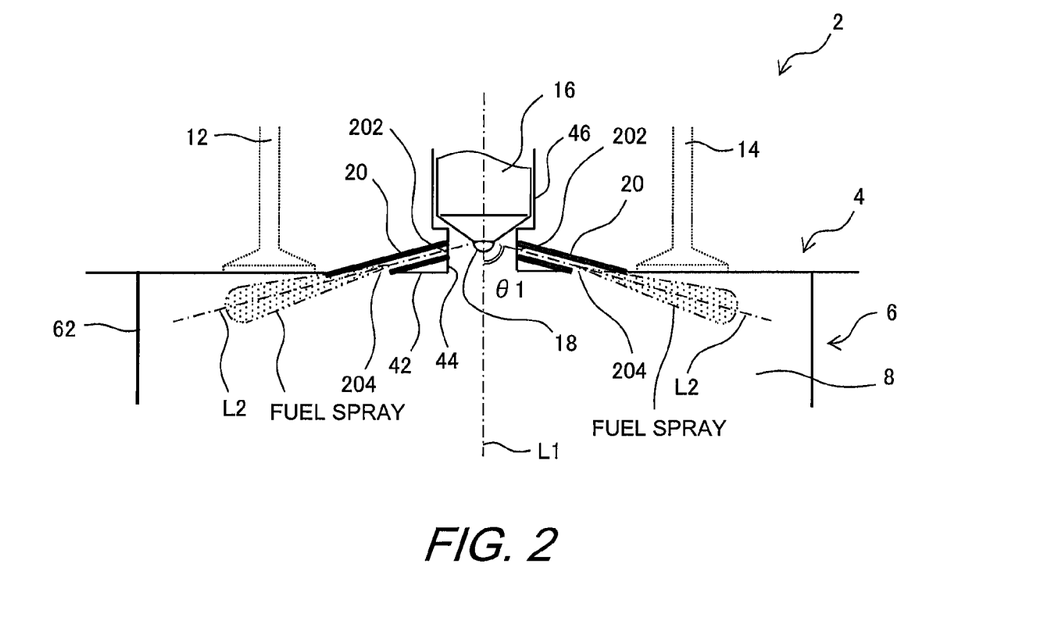
FIG. 2 is a view of the internal structure schematically seen through from a side surface side by cutting the internal combustion engine in FIG. 1 along line A-A.

Further, FIG. 2 is a view of the internal structure schematically seen through from a side surface side by cutting the internal combustion engine in FIG. 1 along line A-A. An internal combustion engine 2 of the first embodiment is a compressed self-ignition type internal combustion engine (hereinafter, simply referred to as an "engine") including a plurality of cylinders. Note that FIGS. 1 and 2 illustrate the internal structure of one cylinder out of a plurality of cylinders included by the engine 2.

As illustrated in FIGS. 1 and 2, the engine 2 includes a cylinder head 4 and a cylinder block 6. A cylinder bore 62 is formed in the cylinder block 6. A piston not illustrated is positioned inside the cylinder bore 62. In a space enclosed by the cylinder head 4, the cylinder bore 62 and a top surface of the piston, a combustion chamber 8 is formed.

On a top surface portion 42 of the cylinder head 4 that forms the combustion chamber 8, two intake valves 12 and two exhaust valves 14 are respectively positioned. In a center of the top surface portion 42, a fuel injection nozzle 16 is positioned. In more detail, in the center of the top surface portion 42, a cylindrical recessed portion 44 that is recessed in a cylindrical shape with a cylinder center axis L1 as a center axis is formed. On the same axis as the cylindrical recessed portion 44, a mounting hole 46 for fixing the fuel injection nozzle 16 communicate. The fuel injection nozzle 16 is fixed to the mounting hole 46 so that a nozzle hole 18 provided at a tip end is exposed into the combustion chamber 8.

In the fuel injection nozzle 16 of the first embodiment, eight nozzle holes 18 that perform injection radially equally toward the cylinder bore 62 are provided. Each of the nozzle holes 18 is configured so that an angle θ1 formed by a nozzle hole axis L2 showing an injection direction of fuel and the cylinder center axis L1 is in a range from 45° to 90°.

The engine 2 of the first embodiment includes a duct 20 as a characteristic configuration thereof. The duct 20 is configured by a straight-line hollow pipe that penetrates through an inside of the cylinder head 4 toward an outlet 204 provided in the top surface portion 42 from an inlet 202 provided in a side surface of the cylindrical recessed portion 44. Further, the duct 20 is configured so that a center axis of the hollow pipe is in a position corresponding to the nozzle hole axis L2. In the engine 2 of the first embodiment, the duct 20 is provided for each of the nozzle hole axes L2 of the eight nozzle holes 18.

1-2. Operation of First Embodiment

In the compressed self-ignition type engine 2, in a state where air charged into the combustion chamber 8 is compressed, fuel is injected from the fuel injection nozzle 16. Combustion by self-ignition is preferably performed after the injected fuel spray is mixed with the charged air and homogenization of fuel concentration is advanced. However, for example, in a configuration without including the duct 20, there is a fear that fuel spray injected from the fuel injection nozzle 16 receives heat of the combustion chamber 8 and overheats quickly, and self-ignites before being sufficiently mixed with the charged air. In this case, generation of smoke as a result of excessively rich fuel burning, and reduction in thermal efficiency due to prolongation of an afterburning period become problems.

In the engine 2 of the first embodiment, as the means for solving the above described problems, the duct 20 is provided in the combustion chamber 8. The fuel spray injected from the fuel injection nozzle 16 is introduced into an inside of the duct 20 from the inlet 202. Further, since the inlet 202 of the duct 20 is exposed into the combustion chamber 8, the charged air inside the combustion chamber 8 is also guided to the inside of the duct 20. The cylinder head 4 which configures the duct 20 has a large heat capacity, and therefore is kept at a relatively low temperature even in an operating state where combustion continues. Consequently, mixing of the fuel spray injected to the duct 20 with the charged air is advanced while the fuel spray is cooled, so that homogenization of the fuel concentration is advanced without the fuel spray being self-ignited early. Mixture gas that is sufficiently premixed is injected from the outlet 204 of the duct 20. The injected mixture gas receives heat of the combustion chamber 8 to be self-ignited and burn.

In this way, according to the engine 2 of the first embodiment, in the process of the fuel spray which is injected passing through the duct 20, premix of the fuel spry and the charged air can be promoted while self-ignition is suppressed. Thereby, it becomes possible to suppress generation of smoke caused by the excessively rich fuel before homogenized being self-ignited.

Further, according to the engine 2 of the first embodiment, self-ignition while passing through the duct 20 is suppressed, so that a self-ignition timing can be retarded. Thereby, the afterburning period is shortened, so that thermal efficiency can be enhanced.

Further, in the engine 2 of the first embodiment, the duct 20 is formed in the cylinder head 4, so that a wall surface temperature of the duct 20 can be kept at a lower temperature than a gas temperature in the combustion chamber 8. Thereby, it becomes possible to prevent overheating of the mixture gas in the duct 20 and promote premix.

Further, in the engine 2 of the first embodiment, the center axis of the duct 20 corresponds to the nozzle hole axis L2. According to the configuration like this, interference of the fuel spray and the wall surface of the duct 20 can be prevented, so that the fuel concentration can be homogenized efficiently.

Further, in the engine 2 of the first embodiment, the angle θ1 which is formed by center axis of the duct 20 with the cylinder center axis L1 is set in the range of 45° to 90°. According to the configuration like this, it becomes possible to suppress reduction in spray penetration force by an air current in the duct 20.

1-3. Modified Example of First Embodiment

The engine 2 of the first embodiment may adopt a mode modified as follows.

As for the configuration of the duct 20, if only the duct 20 is configured so that the fuel spray injected from the nozzle hole 18 of the fuel injection nozzle 16 passes to the outlet 204 from the inlet 202, the shape of the duct 20, the number of ducts 20 and the like are not limited. Further, the cylindrical recessed portion 44 of the cylinder head 4 is not specially limited to the cylindrical shape if only it is in the shape that is exposed to the combustion chamber 8 and can form the inlet 202.

Figure 3:
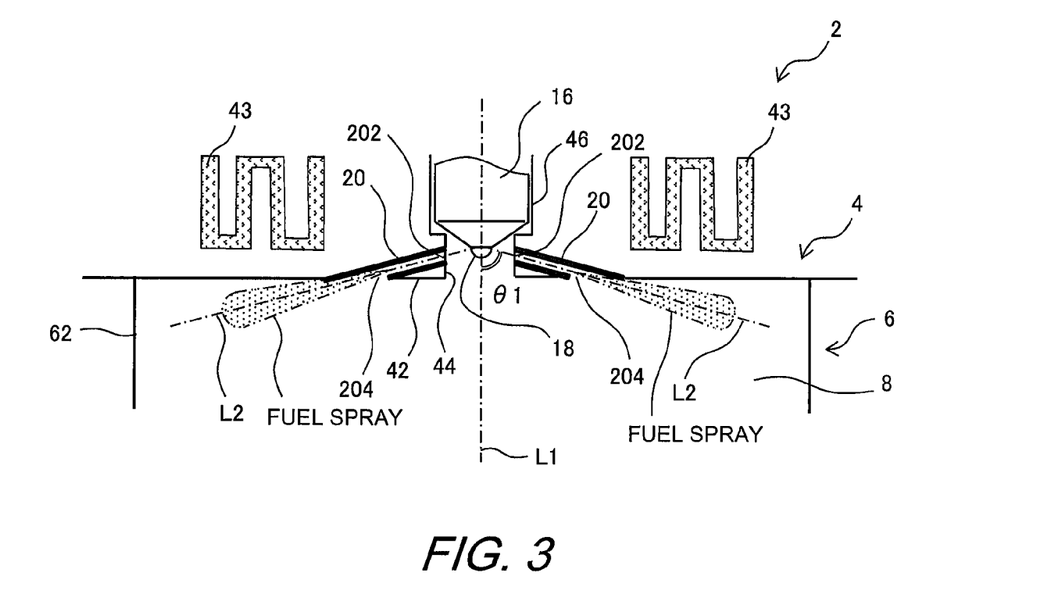
FIG. 3 is a view illustrating a modified example of the engine according to the first embodiment.

A cooling water flow path through which cooling water flows may be provided inside the cylinder head 4. FIG. 3 is a view illustrating a modified example of the engine according to the first embodiment. In the example illustrated in FIG. 3, a cooling water flow path 43 through which cooling water flows is provided inside the cylinder head 4. According to the configuration like this, cooling efficiency of the duct 20 which is formed in the cylinder head 4 is further enhanced.

Second Embodiment

A second embodiment will be described with reference to the drawings.

2-1. Configuration of Second Embodiment

Figure 4:
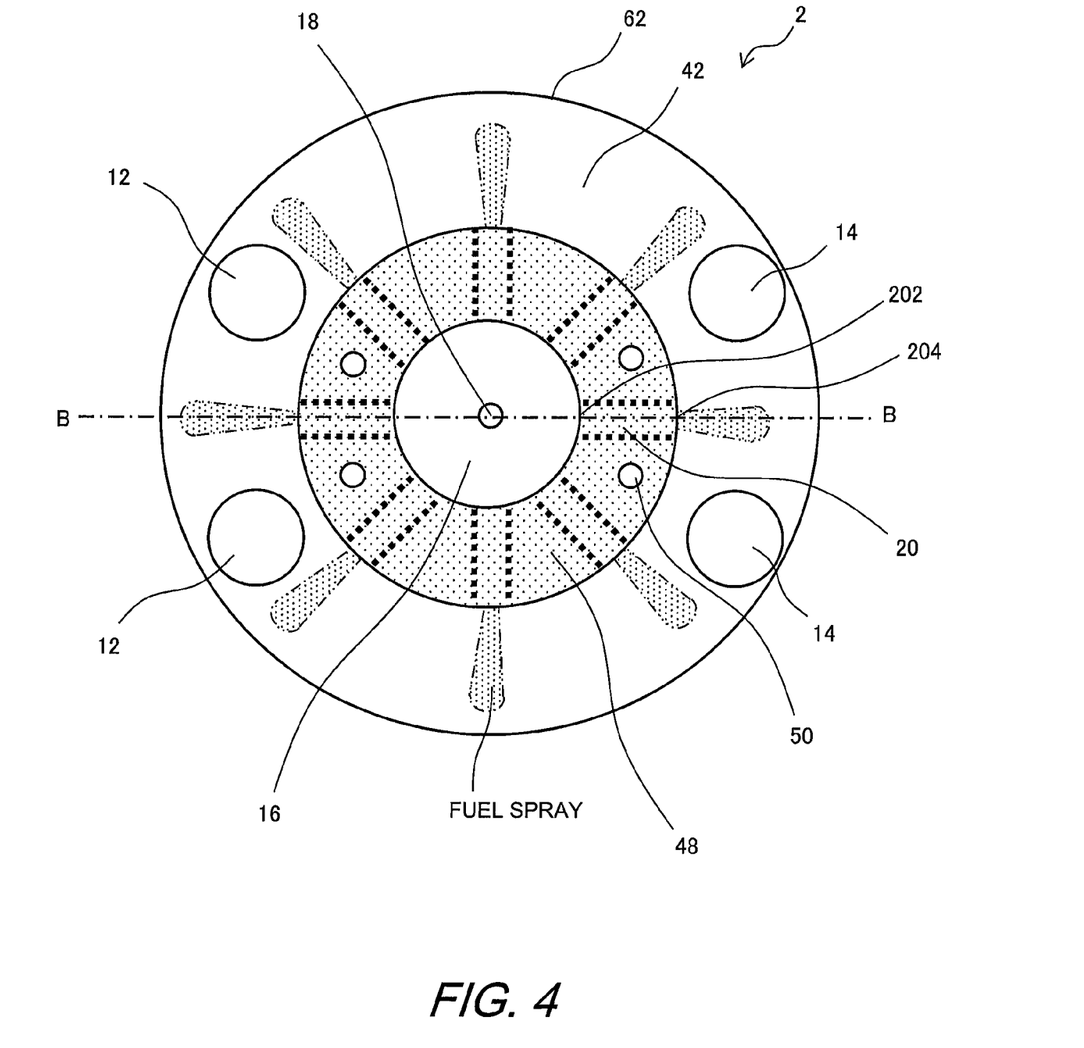
FIG. 4 is a view of an internal structure of a combustion chamber of an engine according to a second embodiment schematically seen through from an undersurface side.
Figure 5:
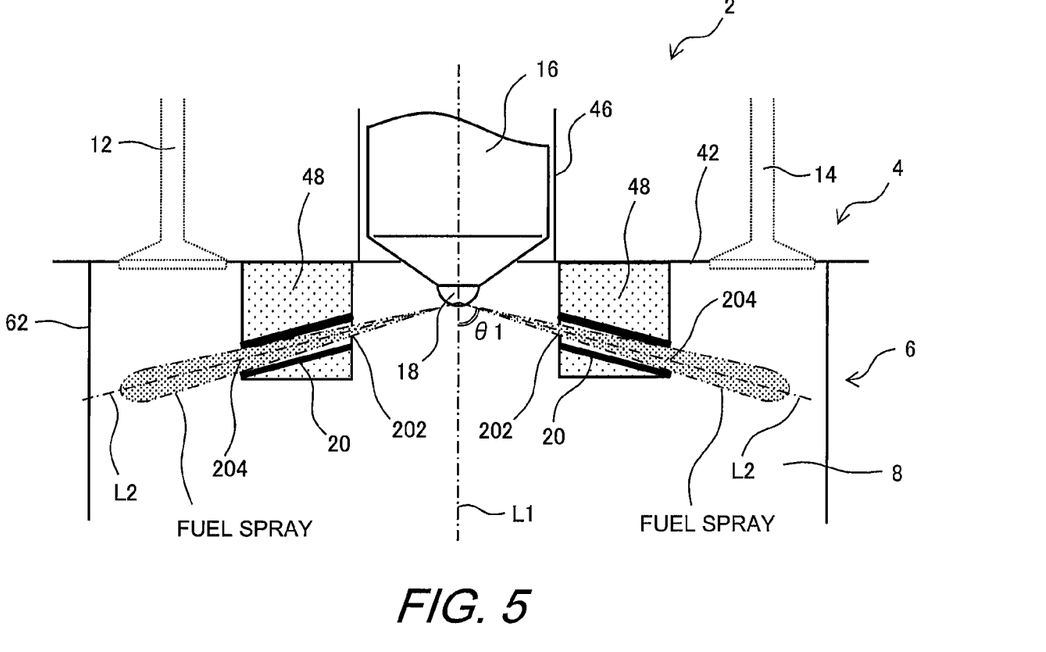
FIG. 5 is a view of the internal structure schematically seen through from a side surface side by cutting the engine in FIG. 4 along line B-B.

FIG. 4 is a view of an internal structure of a combustion chamber of an engine according to the second embodiment schematically seen through from an undersurface side. Further, FIG. 5 is a view of the internal structure schematically seen through from a side surface side by cutting the engine in FIG. 4 along line B-B. Note that in FIGS. 4 and 5, common elements to FIG. 1 or FIG. 2 will be assigned with the same reference signs, and detailed explanation of the elements will be omitted.

As illustrated in FIGS. 4 and 5, in a center of the top surface portion 42 of the cylinder head 4 which forms the combustion chamber 8, the mounting hole 46 for fixing the fuel injection nozzle 16 is penetrated. The fuel injection nozzle 16 is fixed to the mounting hole 46 so that the nozzle hole 18 at a tip end is exposed into the combustion chamber 8.

The engine 2 of the second embodiment includes a duct supporter 48 in which the ducts 20 are formed as a characteristic structure of the engine 2. The duct supporter 48 is an annular member formed into a protruded shape to surround a periphery of the nozzle hole 18 of the fuel injection nozzle 16. The duct supporter 48 is fixed by four bolts 50 to be in close contact with the top surface portion 42 of the cylinder head 4.

The duct 20 is configured by a straight-line hollow pipe that penetrates through an inside of the duct supporter 48 toward the outlet 204 which is provided at an outer circumferential side from the inlet 202 which is provided at an inner circumferential side of the duct supporter 48. Note that the duct 20 is configured so that the center axis of the hollow pipe is in a position corresponding to the nozzle hole axis L2 similarly to the configuration of the duct 20 of the first embodiment.

2-2. Operation of Second Embodiment

In the engine 2 of the second embodiment, the ducts 20 are formed in the duct supporter 48. The duct supporter 48 is fixed in close contact with the cylinder head 4, and therefore can be said as an integrated member that is integrated with the cylinder head 4. Consequently, the duct 20 which is formed in the duct supporter 48 can keep the wall surface temperature of the duct 20 at a lower temperature than the gas temperature in the combustion chamber 8 similarly to the case where the duct 20 is formed in the cylinder head 4. Thereby, it becomes possible to prevent overheating of the mixture gas in the duct 20 and promote premix.

Further, the engine 2 of the second embodiment adopts the configuration in which the duct supporter 48 is fixed to the cylinder head 4, so that a position of the duct 20 to the cylinder head 4 can be adjusted. Further, in the engine 2 of the second embodiment, various duct supporters 48 can be combined with the cylinder head 4, so that even when the specifications of the fuel injection nozzle 16 are changed, commonality of the cylinder head 4 is enabled if only the duct supporter 48 is changed. In this way, in the engine 2 of the second embodiment, flexible response can be made to change in the specifications of the fuel injection mode.

2-3. Modified Example of Second Embodiment

The engine 2 of the second embodiment may adopt a mode that is modified as follows.

As for the duct 20, if only the duct 20 is configured so that the fuel spray injected from the nozzle hole 18 of the fuel injection nozzle 16 passes to the outlet 204 from the inlet 202, the shape of the duct 20, the number of ducts 20 and the like are not limited. Further, the duct supporter 48 is not specially limited to the annular shape if only the duct supporter 48 is formed into a protruded shape to be exposed to the combustion chamber 8 and is in the shape through which the duct 20 can penetrate.

Figure 6:
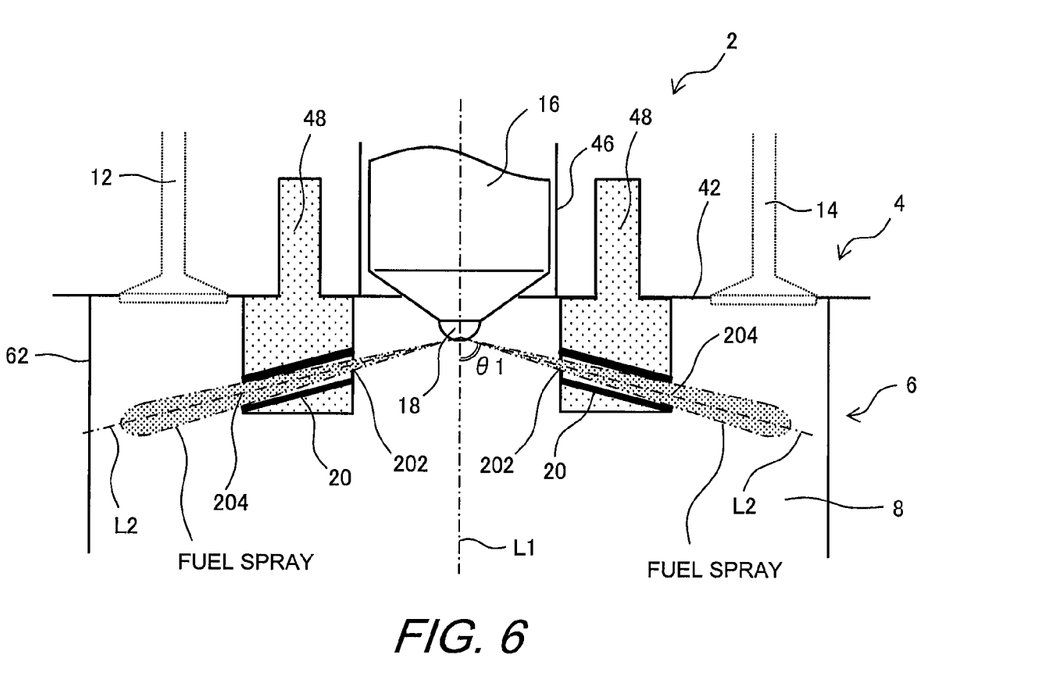
FIG. 6 is a view illustrating a modified example of a duct supporter of the engine according to the second embodiment.

The fixing method of the duct supporter 48 is not limited if only the duct supporter 48 is configured to be fixed in close contact with the cylinder head 4. However, the duct supporter 48 is preferably configured so that a surface area of a surface contacting the cylinder head 4 is larger than a surface area of a surface exposed to the combustion chamber 8. As the configuration like this, a mode as illustrated in FIG. 6 is conceivable, for example. FIG. 6 is a view illustrating a modified example of the duct supporter 48 of the second embodiment. In the example illustrated in FIG. 6, a part of the duct supporter 48 is annularly buried inside the cylinder head 4. According to the configuration like this, a contact area of the duct supporter 48 and the cylinder head 4 can be made larger than the surface area of the surface exposed to the combustion chamber 8, so that it becomes possible to prevent overheating of the duct 20 and enhance cooling performance.

Further, as another preferable mode of the duct supporter 48, a surface area of an inner wall of the duct 20 is preferably configured to be smaller than the surface area of the surface contacting the cylinder head 4. According to the configuration like this, the duct 20 can be made hard to receive heat of the combustion chamber 8 while heat radiation to the cylinder head 4 from the duct supporter 48 is promoted. Thereby, it becomes possible to prevent overheating of the duct 20 and enhance cooling performance.

Surface roughness of the wall surface of the duct 20 is preferably rougher than surface roughness of the duct supporter 48 which is exposed to the combustion chamber 8. According to the configuration of the duct supporter 48 like this, it becomes possible to enhance thermal conductivity to the injected fuel spray and reduce thermal conductivity to the charged gas in the combustion chamber.

Figure 7:
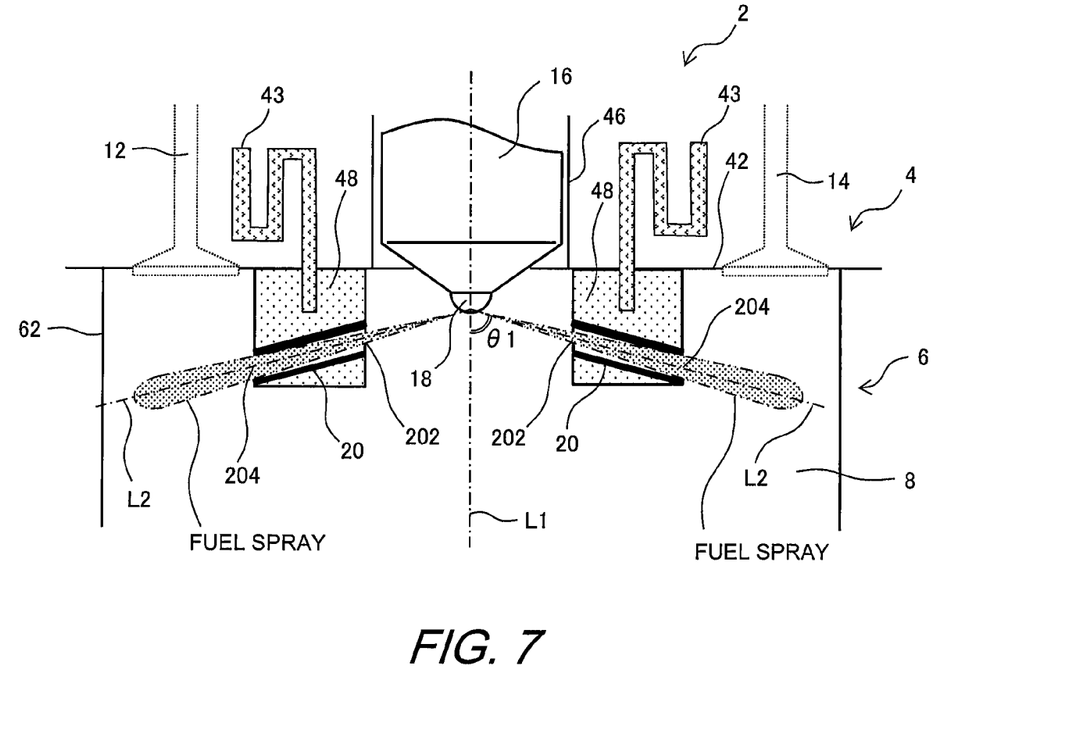
FIG. 7 is a view illustrating a modified example of the engine according to the second embodiment.

Inside the duct supporter 48, a cooling water flow path through which cooling water flows may be provided. FIG. 7 is a view illustrating a modified example of the engine according to the second embodiment. In the example illustrated in FIG. 7, a part of the cooling water flow path 43 through which cooling water flows to an inside of the cylinder head 4 extends to an inside of the duct supporter 48. According to the configuration like this, cooling efficiency of the duct 20 which is formed in the duct supporter 48 is further enhanced.

Third Embodiment

A third embodiment will be described with reference to the drawings.

3-1. Configuration of Third Embodiment

Figure 8:
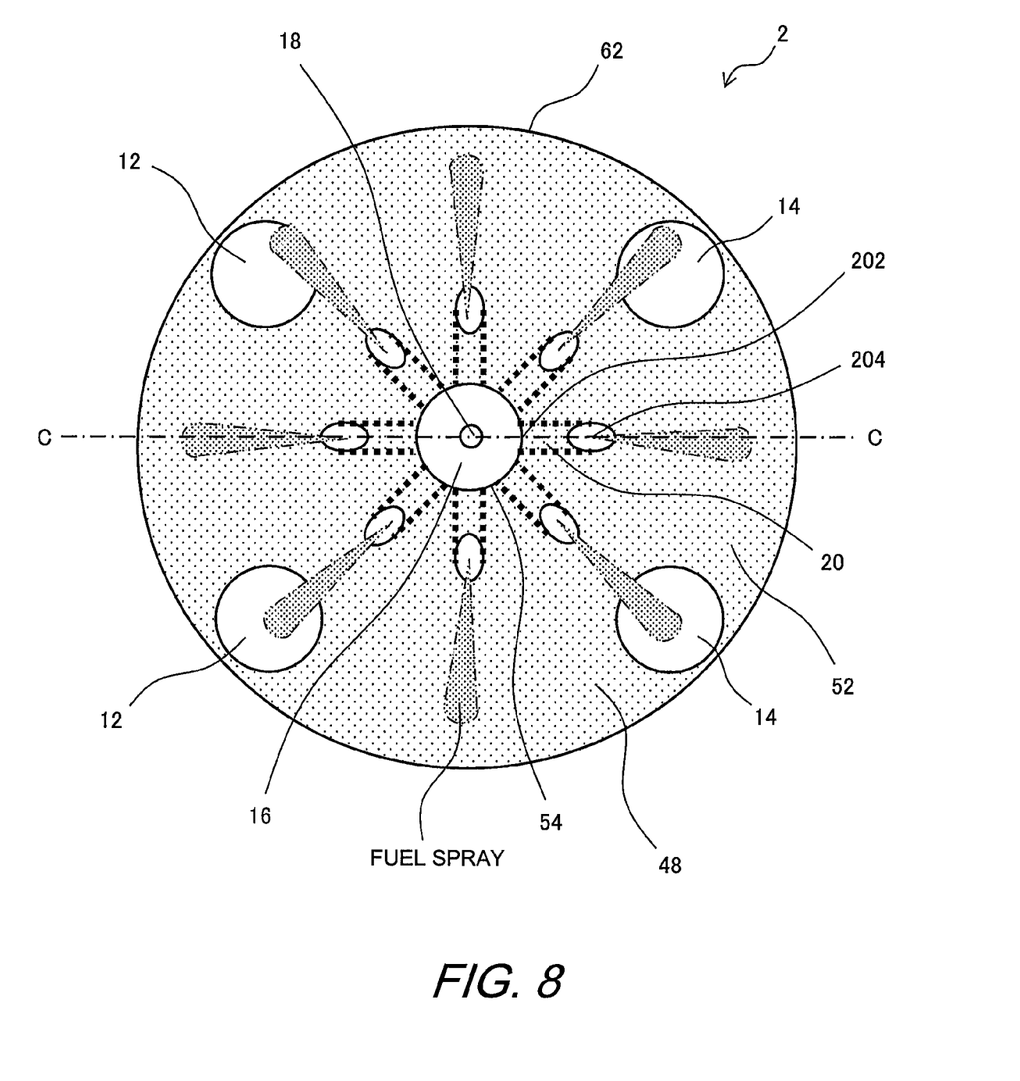
FIG. 8 is a view of an internal structure of a combustion chamber of an engine according to a third embodiment schematically seen through from an undersurface side.
Figure 9:
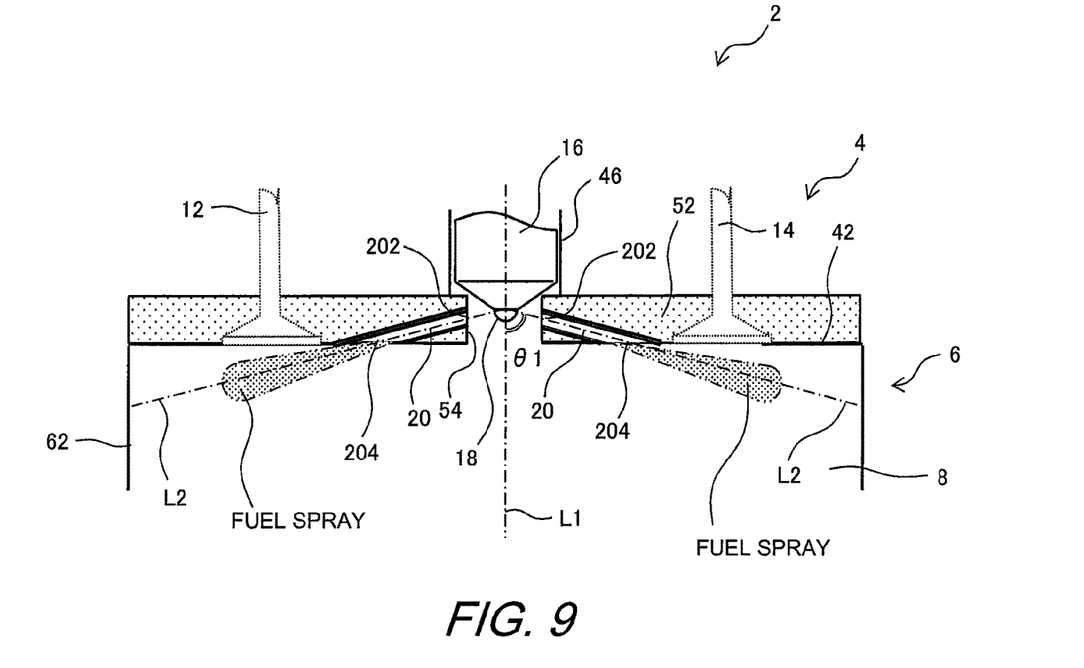
FIG. 9 is a view of the internal structure schematically seen through from a side surface side by cutting the engine in FIG. 8 along line C-C.

FIG. 8 is a view of an internal structure of a combustion chamber of an engine according to the third embodiment schematically seen through from an undersurface side. Further, FIG. 9 is a view of the internal structure schematically seen through from a side surface side by cutting the engine in FIG. 8 along line C-C. Note that in FIGS. 8 and 9, elements common to FIG. 1 or FIG. 2 will be assigned with the same reference signs, and detailed explanation of the elements will be omitted.

As illustrated in FIGS. 8 and 9, in the engine 2 according to the third embodiment, a duct supporter 52 in which the ducts 20 are formed is provided so as to cover a whole range of the top surface portion 42 of the cylinder head 4 that forms the combustion chamber 8. The duct supporter 52 is a plate member sandwiched between the cylinder head 4 and the cylinder block 6, and is provided with a communication hole 54 for exposing the nozzle hole 18 of the fuel injection nozzle 16 into the combustion chamber 8 is provided on the same axis as the mounting hole 46.

The duct 20 is configured by a straight-line hollow pipe that penetrates through an inside of the duct supporter 52 toward the outlet 204 exposed to the combustion chamber 8, from the inlet 202 provided at an inner circumferential side of the communication hole 54. Note that the duct 20 is configured so that the center axis of the hollow pipe is in a position corresponding to the nozzle hole axis L2, similarly to the configuration of the duct 20 of the first embodiment.

3-2. Operation of Third Embodiment

In the engine 2 of the third embodiment, the ducts 20 are formed in the duct supporter 52. The duct supporter 52 is fixed in close contact with the cylinder head 4, and therefore can be said as an integrated member that is integrated with the cylinder head 4. Consequently, the duct 20 formed in the duct supporter 52 can keep the wall surface temperature of the duct 20 at a lower temperature than the gas temperature in the combustion chamber 8, similarly to the case where the duct 20 is formed in the cylinder head 4. Thereby, it becomes possible to prevent overheating of the mixture gas in the duct 20 and promote premix.

Further, in the engine 2 of the third embodiment, various duct supporters 52 can be combined with the cylinder head 4, so that even when the specifications of the fuel injection nozzle 16 are changed, commonality of the cylinder head 4 is enabled if the duct supporter 52 is changed. In this way, in the engine 2 of the third embodiment, flexible response is enabled to a change in the specifications of the fuel injection mode.

3-3. Modified Example of Third Embodiment

The engine 2 of the third embodiment may adopt modes that are modified as follows.

As for If only the duct 20 is configured so that the fuel spray injected from the nozzle hole 18 of the fuel injection nozzle 16 passes to the outlet 204 from the inlet 202, the shape of the duct 20, the number of ducts 20 and the like are not limited. Further, the duct supporter 52 is not specially limited to the annular shape if only the duct supporter 52 is formed into a protruded shape that is exposed into the combustion chamber 8 and is in the shape through which the ducts 20 can penetrate.

A fixing method of the duct supporter 52 is not limited, if only the duct supporter 52 is configured to be fixed in close contact with the cylinder head 4. For example, the duct supporter 52 may be configured to be fastened to the cylinder head 4 with bolts.

Figure 10:
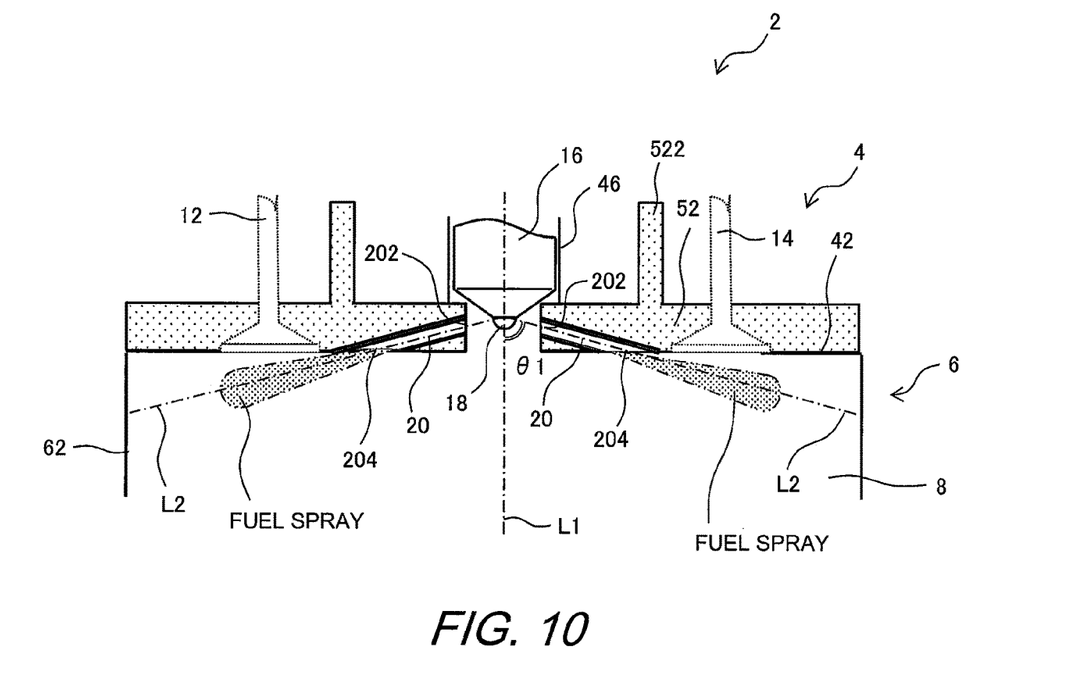
FIG. 10 is a view illustrating a modified example of a duct supporter of the engine according to the third embodiment.

The duct supporter 52 is preferably configured so that a surface area of a surface contacting the cylinder head 4 is larger than a surface area of a surface exposed to the combustion chamber 8. As the configuration like this, for example, a mode as illustrated in FIG. 10 is conceivable. FIG. 10 is a view illustrating a modified example of the duct supporter 52 of the engine 2 according to the third embodiment. In the example illustrated in FIG. 10, a protruded portion 522 which is protruded annularly to a side of the cylinder head 4 from the duct supporter 52 is buried inside the cylinder head 4. According to the configuration like this, a contact area of the duct supporter 52 and the cylinder head 4 can be made larger than a surface area of the surface exposed to the combustion chamber 8, so that it becomes possible to prevent overheating of the duct 20 and enhance cooling performance.

Surface roughness of the wall surface of the duct 20 is preferably rougher than surface roughness of the duct supporter 52 which is exposed to the combustion chamber 8. According to the configuration of the duct supporter 52 like this, it becomes possible to enhance thermal conductivity to the injected fuel spray and reduce thermal conductivity to the charged gas in the combustion chamber.

What is claimed is:

1. An internal combustion engine of a compressed self-ignition type that performs combustion by injecting fuel into a compressed combustion chamber, comprising:
   a fuel injection nozzle having a nozzle hole that injects fuel, the nozzle hole being directly exposed within the combustion chamber from a cylinder head of the internal combustion engine; and
   a hollow duct in which an inlet and an outlet are exposed within the combustion chamber,
   wherein the cylinder head includes an integrated member integrated with a top surface, and the duct is configured to penetrate through the integrated member so that fuel spray injected from the nozzle hole of the fuel injection nozzle passes from the inlet to the outlet,
   wherein the integrated member is configured so that a surface area of a surface contacting the cylinder head is larger than a surface area of a surface exposed to the combustion chamber, and
   wherein in the integrated member, a periphery of the nozzle hole is formed into a shape that is protruded annularly.

2. The internal combustion engine according to claim 1, wherein the duct is configured so that a direction from the inlet to the outlet corresponds to a direction of the fuel spray injected from the nozzle hole.

3. The internal combustion engine according to claim 1, wherein the fuel injection nozzle has a plurality of the nozzle holes that differ in injection direction, and
   a plurality of the ducts are provided correspondingly to the respective plurality of nozzle holes.

4. The internal combustion engine according to claim 1, wherein the fuel injection nozzle is configured so that an injection direction of the nozzle hole is in a range from 45° to 90° with respect to a cylinder center axis.

5. The internal combustion engine according to claim 1, wherein the integrated member is configured so that a surface area of an inner wall of the duct is smaller than a surface area of a surface contacting the cylinder head.

6. The internal combustion engine according to claim 1, wherein the integrated member is configured so that surface roughness of a surface where the duct is formed is rougher than surface roughness of a surface exposed to the combustion chamber.

7. The internal combustion engine according to claim 1, wherein the integrated member is configured to cover a whole range of the top surface.

8. The internal combustion engine according to claim 1, wherein a cooling water flow path through which cooling water flows is formed inside the cylinder head.

* * * * *

UNITED STATES PATENT AND TRADEMARK OFFICE
CERTIFICATE OF CORRECTION

| | |
|---|---|
| PATENT NO. | : 11,293,393 B2 |
| APPLICATION NO. | : 16/173049 |
| DATED | : April 5, 2022 |
| INVENTOR(S) | : Takeshi Hashizume |

It is certified that error appears in the above-identified patent and that said Letters Patent is hereby corrected as shown below:

On the Title Page

Item (73), should read:
--(73) Assignee: TOYOTA JIDOSHA KABUSHIKI KAISHA, Toyota (JP)--

Signed and Sealed this
Twenty-eighth Day of June, 2022

Katherine Kelly Vidal
*Director of the United States Patent and Trademark Office*